(12) United States Patent
Chen

(10) Patent No.: US 10,386,085 B2
(45) Date of Patent: Aug. 20, 2019

(54) SEMICONDUCTOR-BASED AIR CONDITIONING DEVICE

(71) Applicant: Chuan-Sheng Chen, Taipei (TW)

(72) Inventor: Chuan-Sheng Chen, Taipei (TW)

( * ) Notice: Subject to any disclaimer, the term of this patent is extended or adjusted under 35 U.S.C. 154(b) by 265 days.

(21) Appl. No.: 15/475,141

(22) Filed: Mar. 31, 2017

(65) Prior Publication Data

US 2018/0023823 A1 Jan. 25, 2018

(30) Foreign Application Priority Data

Jul. 19, 2016 (TW) .............................. 105122672 A

(51) Int. Cl.
*F24F 5/00* (2006.01)
*F25B 21/02* (2006.01)

(52) U.S. Cl.
CPC ............ *F24F 5/0042* (2013.01); *F25B 21/02* (2013.01); *F25B 2321/0212* (2013.01); *F25B 2321/0252* (2013.01); *Y02T 10/166* (2013.01)

(58) Field of Classification Search
CPC . F24F 5/0042; F25B 21/02; F25B 2321/0212; F25B 2321/0252; Y02T 10/166
See application file for complete search history.

(56) References Cited

U.S. PATENT DOCUMENTS

| 7,251,943 B2 * | 8/2007 | Chen ..................... F24F 5/0042 62/259.2 |
| 2013/0247600 A1 * | 9/2013 | Lu .......................... B64D 13/08 62/89 |

FOREIGN PATENT DOCUMENTS

EP 2295879 A1 * 3/2011 ................ F24F 1/02

* cited by examiner

*Primary Examiner* — Ana M Vazquez
(74) *Attorney, Agent, or Firm* — Leong C. Lei

(57) ABSTRACT

The semiconductor-based air conditioning device includes at least a thermoelectric cooling chip, a cooling circulating member, a heat dissipating member, and a power provisioning and temperature controller. The cooling circulating member is joined to a cold production surface, and the heat dissipating member is joined to a heat production surface, of the thermoelectric cooling chip. Each of the cooling circulating member and the heat dissipating member includes a circulating box, a fan, and an auxiliary conduction device. Each circulating box is covered with fins and surrounding pipes. Each fan is located adjacent to corresponding fins. Each auxiliary conduction device includes an electrical pump. Fluid is stored and circulated in the surrounding pipes of each circulating box. Each electrical pump is configured to pump the fluid in a corresponding circulating box, and fluid is circulated to absorb the cold or heat from the thermoelectric cooling chip.

3 Claims, 4 Drawing Sheets

SEMICONDUCTOR-BASED AIR CONDITIONING DEVICE

BACKGROUND OF THE INVENTION

(a) Technical Field of the Invention

The present invention generally relates to air conditioning devices and, more particularly, to an air conditioning device utilizing a thermoelectric cooling chip.

(b) Description of the Prior Art

Traditional air conditioners and refrigerators utilize compressor and refrigerant to produce the required low temperatures. The use of the compressor has quite a few disadvantages. The compressor is heavy and bulky, making the installation and transportation very inconvenient. The compressor also consumes a lot of energy and produces annoying noise that significantly affects the quality of life. The location of installation is also limited if disturbance to the neighbors by the dripping water and operation noise has to be avoided. Therefore energy-saving air conditioners that are also convenient to move and install with reduced noise are a desirable product.

U.S. Pat. No. 7,251,943 teaches an effective semiconductor-based air conditioning device but there is still room for improvement for the device's efficiency. As shown in FIGS. 1 to 3, the air conditioning device includes at least a thermoelectric cooling chip 2 as a source of temperature difference. A cooling circulating member 3 and a heat dissipating member 4 are fixedly installed on a cold production surface and a heat production surface of the thermoelectric cooling chip 2, respectively. A power supply member 1 and a temperature controller 5 are electrically connected to and provide controlled power to the thermoelectric cooling chip 2. The cooling circulating member 3 contains a cold conduction plate 31, cooling pipes 32, and fins 33. The heat dissipating member 4, on the other hand, contains a heat conduction plate 41, heat dissipating pipes 42, fins 43, and a fan 44. The cold and heat conduction plates 31 and 41 are hollow plates having an appropriate circulating fluid stored inside, and are made of metallic materials having high thermal conductivity such as copper or aluminum. A desired temperature is set by temperature up/down buttons 52 and a temperature fixing button 51 of the temperature controller 5. By installing the semiconductor-based air conditioning device between inner and outer walls of a household that separates a cooling area and a heat dissipating area, an indoor temperature may be controlled at will to achieve the required cool or warm effect. Despite its effectiveness, the device's circulating fluid flow uncontrollably in and out of the cooling pipes 32 and the heat dissipating pipes 42, and therefore its efficiency is not satisfactory compared to where circulating fluid is forced to circulate by electrical pump.

In addition, the heat dissipating member 4 dissipates heat in an air-cooling manner using fan 44 to blow at the fins 43. However, it is well known that air cooling is less effective than water cooling. If the heat may be dissipated even more quickly and is prevented from circulating back to the thermoelectric cooling chip 2, the performance of the thermoelectric cooling chip 2 could be even better. Therefore, there is still room for improvement for the heat dissipating member 4.

SUMMARY OF THE INVENTION

Therefore, a novel semiconductor-based air conditioning device is provided herein so as to obviate the shortcomings of the prior art.

The present invention is an improvement over U.S. Pat. No. 7,251,943. The semiconductor-based air conditioning device includes at least a thermoelectric cooling chip, a cooling circulating member, a heat dissipating member, and a power provisioning and temperature controller (an integration of the power supply member and the temperature controller of the prior art). The cooling circulating member is joined to a cold production surface, and the heat dissipating member is joined to a heat production surface, of the thermoelectric cooling chip. Each of the cooling circulating member and the heat dissipating member includes a circulating box, a fan, and an auxiliary conduction device. Each circulating box is covered with fins (similar to the fins of the prior art) and surrounding pipes (similar to the prior art). Each fan is located adjacent to corresponding fins. Each auxiliary conduction device includes an electrical pump. Fluid is stored and circulated in the surrounding pipes of each circulating box. Each electrical pump is configured to pump the fluid in a corresponding circulating box, and fluid is circulated through a conduction plate (similar to the prior art) of each circulating box to absorb the cold or heat from the thermoelectric cooling chip. The power provisioning and temperature controller has input terminals, output terminals, and a main control interface. The input terminals are electrically connected to a power source, the output terminals are electrically connected to the thermoelectric cooling chip, and the main control interface has a power on/off switch, temperature up/down buttons, and a temperature fixing button. As such, the semiconductor-based air conditioning device is able to achieve required cool or warm effect with enhanced efficiency by forcing cooling fluid to circulate by electrical pump, which is the main objective of the present invention.

The auxiliary conduction device of the heat dissipating member further includes a cooling tank, a tank circulating pump, a pump inlet pipe, and a pump outlet pipe. The pump inlet pipe has an end plugged into a bottom section of the cooling tank and another end connected an inlet of the tank circulating pump. An outlet of the tank circulating pump is connected to an end of the pump outlet pipe whose another end is plugged into a top section of the cooling tank above a cooling fluid level. The circulating box of the heat dissipating member except the conduction plate is submerged in the cooling tank beneath the cooling fluid level so that the fins and surrounding pipes are water-cooled. The fan is configured on an inner wall of the cooling tank above the cooling fluid level; the fluid inside the cooling tank is repeatedly drawn by the tank circulating pump to be sprayed above the cooling fluid level so that the fluid is air-cooled. As such, the residual heat may be dissipated more quickly so as to prevent the residual heat from accumulation and adversely affecting the thermoelectric cooling chip, which is another objective of the present invention.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings, identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
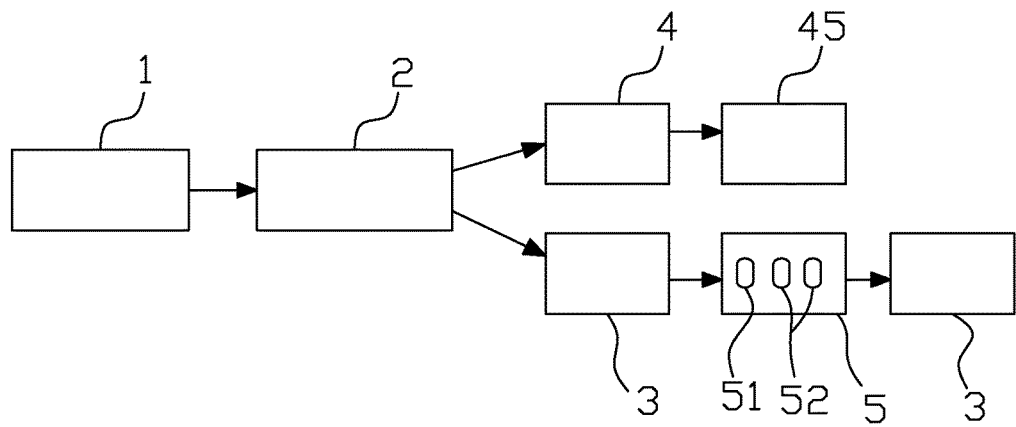
FIG. 1 is a block diagram of a conventional semiconductor-based air conditioning device.
Figure 2:
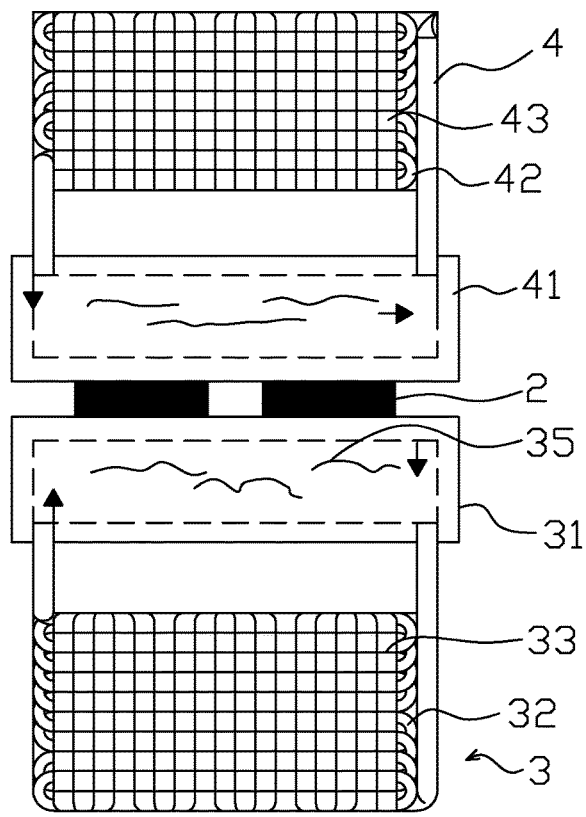
FIG. 2 is a schematic diagram showing the conventional semiconductor-based air conditioning device of FIG. 1.
Figure 3:
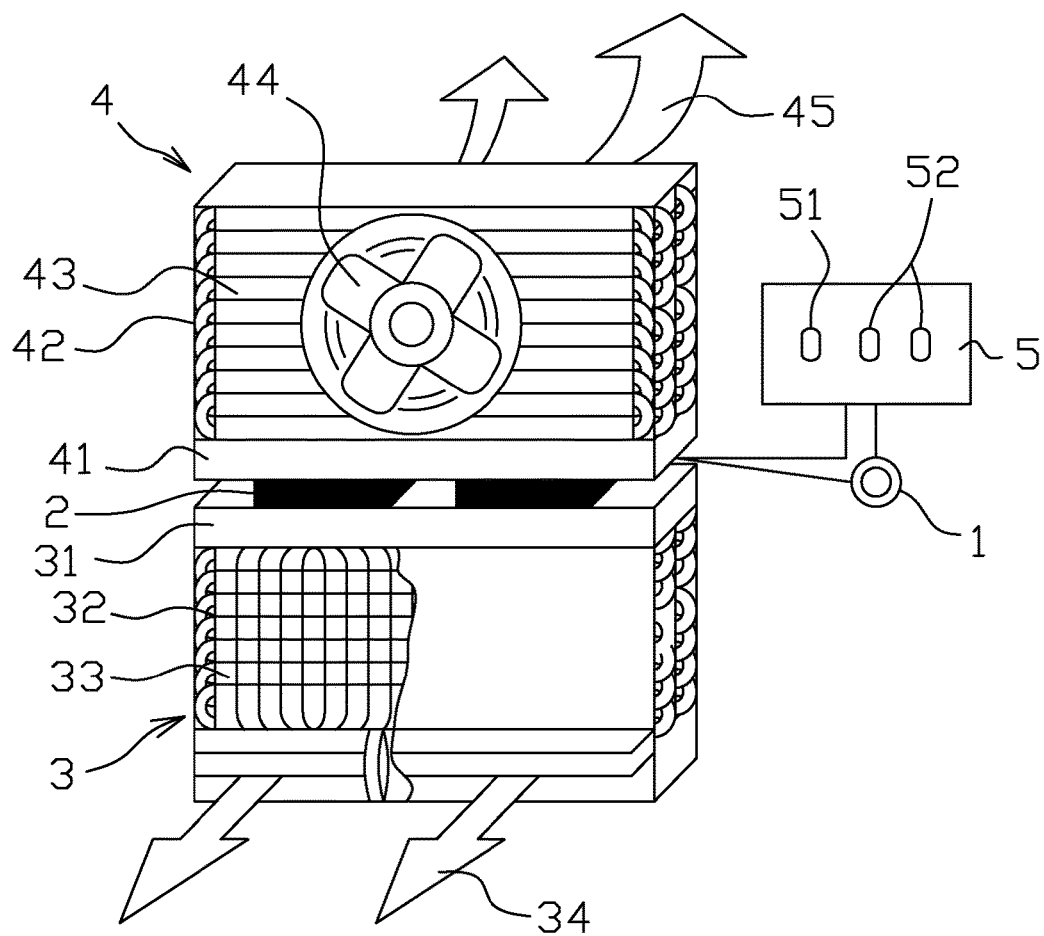
FIG. 3 is a perspective diagram showing the conventional semiconductor-based air conditioning device of FIG. 1.
Figure 4:
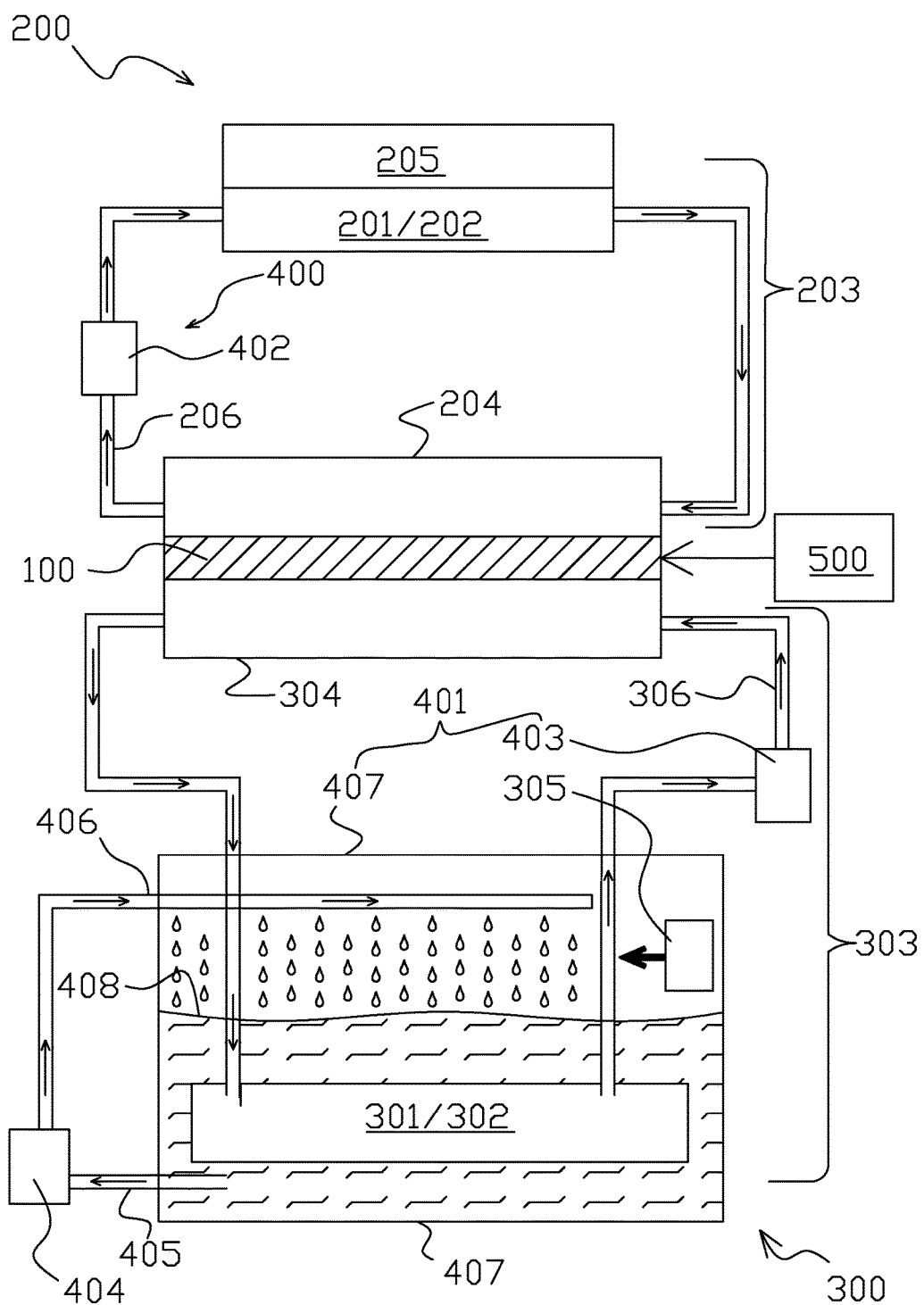
FIG. 4 is a schematic diagram showing a semiconductor-based air conditioning device according to an embodiment of the present invention.
Figure 5:
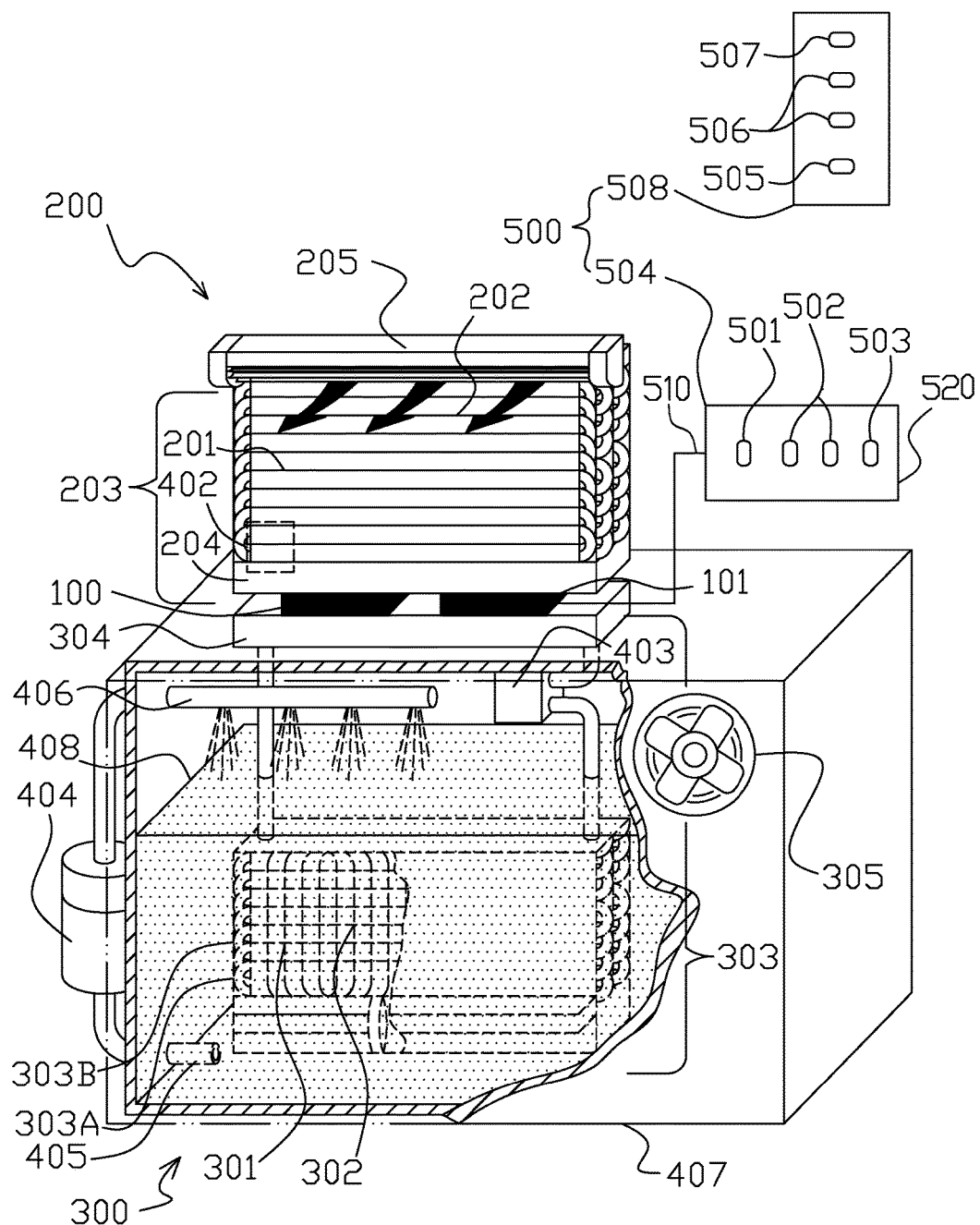
FIG. 5 is a perspective diagram showing the semiconductor-based air conditioning device of FIG. 4.

FIG. 4 is a schematic diagram showing the operation of a semiconductor-based air conditioning device according to an embodiment of the present invention. FIG. 5 is a perspective schematic diagram showing the semiconductor-based air conditioning device. As illustrated, the semiconductor-based air conditioning device mainly include at least a thermoelectric cooling chip 100, 101, a cooling circulating member 200, a heat dissipating member 300, and a power provisioning and temperature controller 500. The thermoelectric cooling chips 100 and 101 are electrically connected to the power provisioning and temperature controller 500. When electricity is introduced, each thermoelectric cooling chip 100 or 101 has a cold production surface and a heat production surface opposite to the cold production surface. The cold production surface is tightly joined to the cooling circulating member 200, and the heat production surface is tightly joined to the heat dissipating member 300. The cooling circulating member 200 and the heat dissipating member 300 respectively include circulating boxes 203 and 303, fans 205 and 305, and auxiliary conduction devices 400 and 401. The circulating boxes 203 and 303 have their surfaces covered with fins 201, 202, and 301, 302, respectively. The auxiliary conduction devices 400 and 401 respectively include electrical pumps 402 and 403. The circulating boxes 203 and 303 also have conduction plates 204 and 304 that are tightly attached to the cold and heat production surfaces of the thermoelectric cooling chips 100 and 101, respectively. Fluid stored and circulated within the circulating boxes 203 and 303, therefore, absorb the cold and heat from the thermoelectric cooling chips 100 and 101. The fans 205 and 305 are located adjacent to the fins 201, 202, 301, and 302. The electrical pumps 402 and 403 are configured at where it is appropriate to pump the fluid in the circulating boxes 203 and 303, respectively. For example, as shown in FIG. 4, the electrical pump 402 is configured in a middle section of a cold fluid outlet pipe 206 connected between the conduction plate 204 and the fins 201 and 202. Similarly, the electrical pump 403 is configured in a middle section of a cold fluid recycle pipe 306 connected between the conduction plate 304 and the fins 301 and 302. By the pumping of the electrical pumps 402 and 403, the fluid within the circulating boxes 203 and 303 is circulated faster, thereby enhancing the temperature conditioning efficiency by the cooling circulating member 200 and the heat dissipating member 300 to their surrounding space. The fan 205 for the fins 201 and 202 of the cold circulating member 200 could be a cross-flow fan that blows cooled air from the heat exchange process between the fins 201 and 202, and the surrounding air.

The power provisioning and temperature controller 500 has output terminals 510 electrically connected to the thermoelectric cooling chips 100 and 101, and input terminals 520 electrically connected to a power source. The power provisioning and temperature controller 500 has a main control interface 504 with a power on/off switch 501, temperature up/down buttons 502, and a temperature fixing button 503. The power provisioning and temperature controller 500 may also have an auxiliary control interface 508 that remotely controls the main control interface 504 with a power on/off switch 505, temperature up/down buttons 506, and a temperature fixing button 507.

The auxiliary conduction device 401 of the heat dissipating member 300 includes, in addition to the electrical pump 403, a cooling tank 407, a tank circulating pump 404, a pump inlet pipe 405, and a pump outlet pipe 406. The pump inlet pipe 405 has an end plugged into a bottom section of the cooling tank 407 and another end connected an inlet of the tank circulating pump 404. An outlet of the tank circulating pump 404 is connected to an end of the pump outlet pipe 406 whose another end is plugged into a top section of the cooling tank 407 above a cooling fluid level 408. The circulating box 303 of the heat dissipating member 300 except the conduction plate 304 is submerged in the cooling tank 407 beneath the cooling fluid level 408 so that the fins 301, 302 and surrounding pipes 303A, 303B are water-cooled. The fan 305 is configured on an inner wall of the cooling tank 407 above the cooling fluid level 408. The cooling fluid inside the cooling tank 407 is repeatedly drawn by the tank circulating pump 404 to be sprayed above the cooling fluid level 408 so that the cooling fluid is air-cooled. Therefore the fins 301, 302 and the surrounding pipes 303A and 303B, and the residual heat from the heat dissipating member, are quickly cooled down and dissipated by the continuously circulating cooling fluid, thereby avoiding heat accumulation to affect the cold production surface and compromise the cooling performance.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A semiconductor-based air conditioning device, comprising:
   a power provisioning and temperature controller having input terminals, output terminals, and a main control interface, where the input terminals are electrically connected to a power source, and the main control interface has a power on/off switch, temperature up/down buttons, and a temperature fixing button;
   at least a thermoelectric cooling chip electrically connected to the output terminals of the power provisioning and temperature controller, where the thermoelectric cooling chip has a cold production surface and a heat production surface opposite to the cold production surface when electricity is conducted through the thermoelectric cooling chip;

a cooling circulating member tightly joined to the cold production surface; and a heat dissipating member tightly joined to the heat production surface; wherein each of the cooling circulating member and the heat dissipating member comprises a circulating box, a fan, and an auxiliary conduction device; each circulating box is covered with fins and surrounding pipes; each fan is located adjacent to corresponding fins; each auxiliary conduction device comprises an electrical pump; fluid is stored and circulated in the surrounding pipes of each circulating box; each electrical pump is configured to pump the fluid in a corresponding circulating box; and fluid is circulated through a conduction plate of each circulating box to absorb the cold or heat from the thermoelectric cooling chip;

wherein the auxiliary conduction device of the heat dissipating member further comprises a cooling tank, a tank circulating pump, a pump inlet pipe, and a pump outlet pipe; the pump inlet pipe has an end plugged into a bottom section of the cooling tank and another end connected to an inlet of the tank circulating pump; an outlet of the tank circulating pump is connected to an end of the pump outlet pipe whose another end is plugged into a top section of the cooling tank above a cooling fluid level; the circulating box of the heat dissipating member except the conduction plate is submerged in the cooling tank beneath the cooling fluid level so that the fins and surrounding pipes are water-cooled; the fan is configured on an inner wall of the cooling tank above the cooling fluid level; the fluid inside the cooling tank is repeatedly drawn by the tank circulating pump to be sprayed above the cooling fluid level so that the fluid is air-cooled.

2. The semiconductor-based air conditioning device according to claim 1, wherein the power provisioning and temperature controller further has an auxiliary control interface that remotely controls the main control interface; and the auxiliary control interface has a power on/off switch, temperature up/down buttons, and a temperature fixing button.

3. The semiconductor-based air conditioning device according to claim 1, wherein the fan of the cold circulating member is a cross-flow fan.

* * * * *